Sept. 20, 1955 L. M. BROWNING, JR 2,718,458
METHOD AND APPARATUS FOR PREPARING FINELY DIVIDED
ANHYDROUS ALKALI METAL HYDROXIDES
Filed Dec. 26, 1951 3 Sheets-Sheet 1
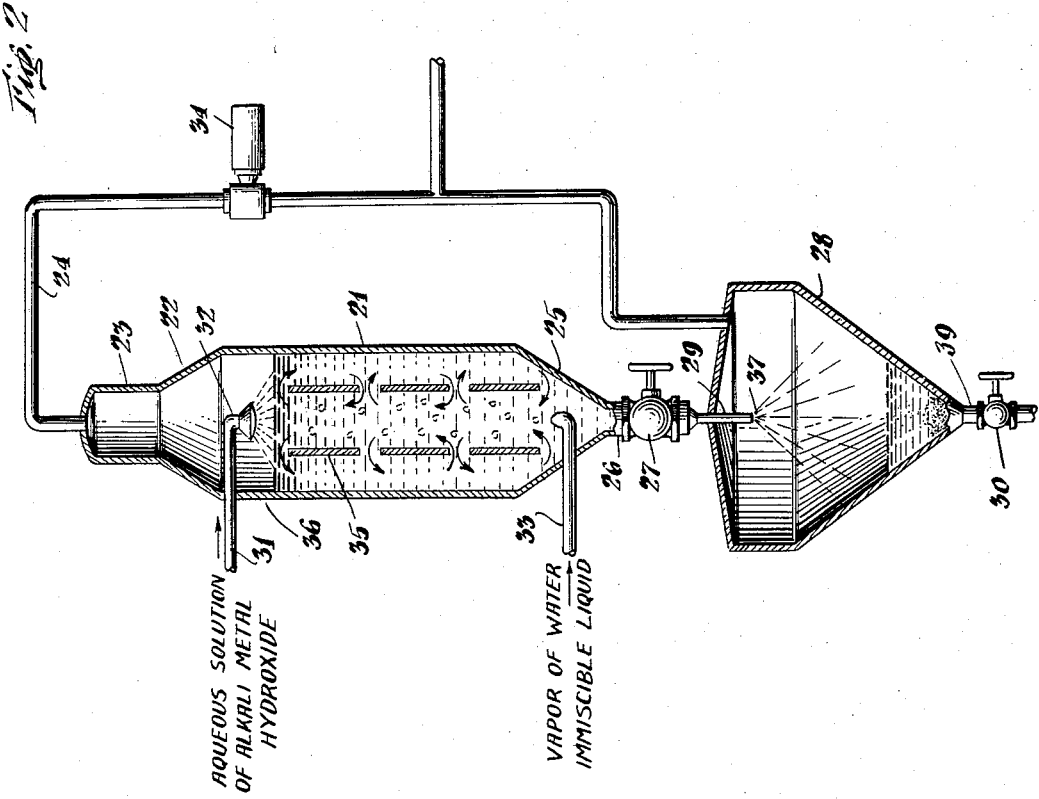
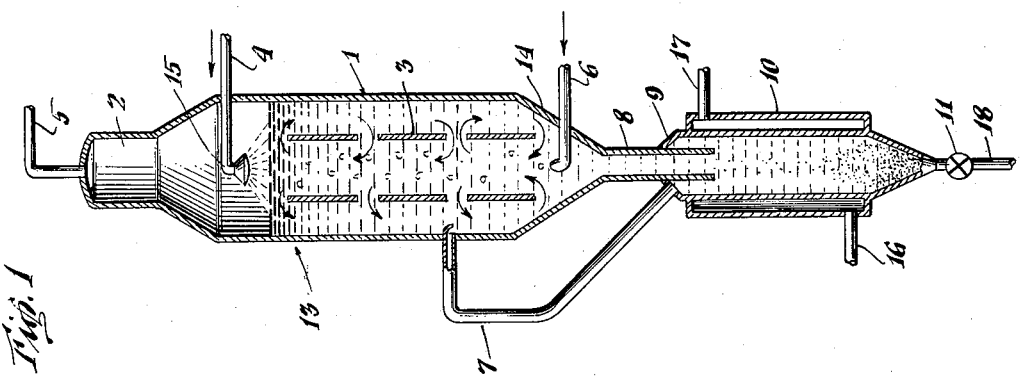
INVENTOR.
Lewis M. Browning, Jr.
BY
AGENT Sept. 20, 1955 L. M. BROWNING, JR 2,718,458
METHOD AND APPARATUS FOR PREPARING FINELY DIVIDED
ANHYDROUS ALKALI METAL HYDROXIDES
Filed Dec. 26, 1951 3 Sheets-Sheet 2

INVENTOR.
Lewis M. Browning, Jr.
BY Francis J. Johnston
AGENT

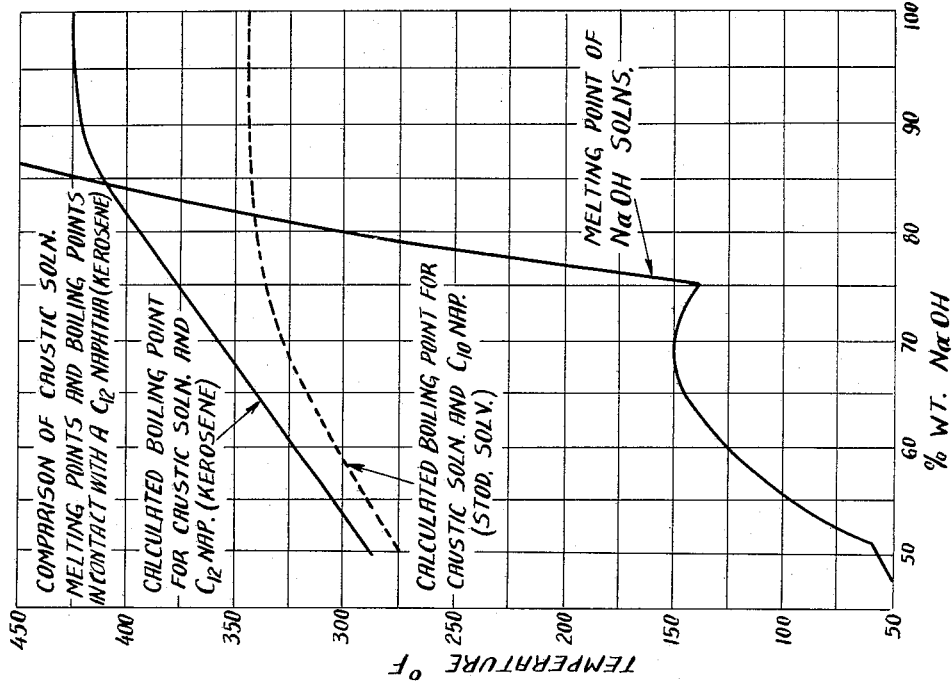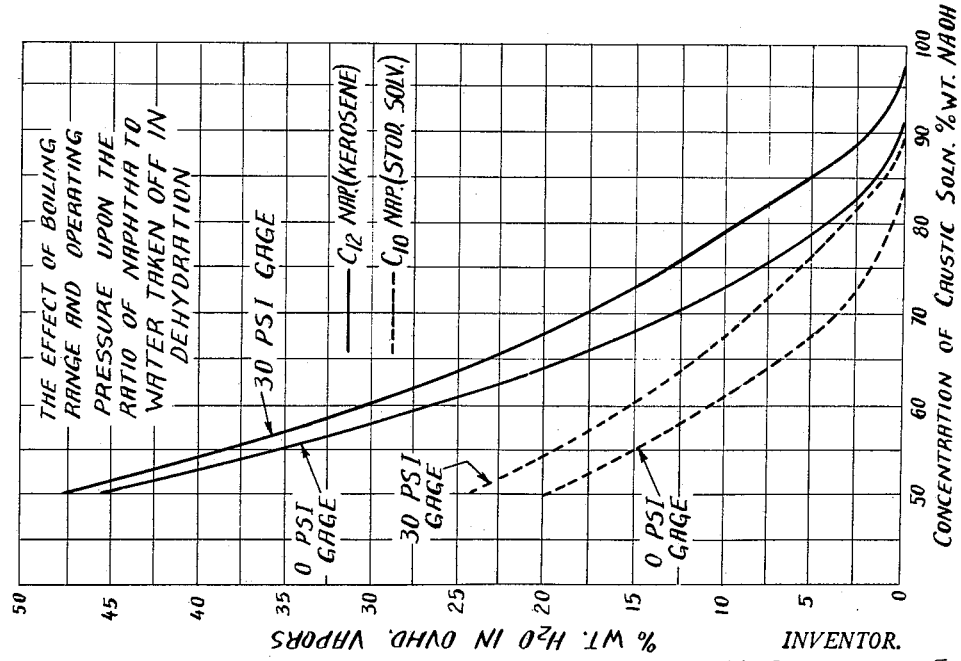

United States Patent Office 2,718,458
Patented Sept. 20, 1955

2,718,458

METHOD AND APPARATUS FOR PREPARING FINELY DIVIDED ANHYDROUS ALKALI METAL HYDROXIDES

Lewis M. Browning, Jr., Woodbury, N. J., assignor to Socony Mobil Oil Company Inc., a corporation of New York Application December 26, 1951, Serial No. 263,461

10 Claims. (Cl. 23—184)

The present invention relates to the preparation of finely divided anhydrous alkali metal hydroxides and, more particularly, to the preparation of colloidal particles of anhydrous alkali metal hydroxide.

In general, alkali metal hydroxides are available commercially, as represented by caustic soda, in three forms: aqueous solutions, solid masses, or as flakes and powder of greater than colloidal dimensions. On the other hand, for many purposes it is desirable to use alkali metal hydroxides as solid particles of colloidal or nearly colloidal size. Thus, for example, in U. S. Patent No. 2,311,593, Kalichevsky et al., disclose the use of colloidal particles of alkali metal hydroxides for the removal of weakly acid sulfur compounds such as mercaptans from hydrocarbon mixtures such as petroleum fractions. These patentees define colloidal particles as those having a diameter between 0.00001 centimeter and 0.0000001 centimeter.

The preparation of finely divided anhydrous alkali metal hydroxides has been the subject of various investigations which have been reported. These methods have involved distillation of a solution of the alkali metal hydroxide in the presence of a non-miscible liquid such as a hydrocarbon. All attempts to prepare a finely divided anhydrous alkali metal hydroxide by distillation of a solution thereof in the presence of a non-miscible liquid by the techniques described in the literature were unsatisfactory for continuous operation.

For example, passing caustic solutions counter-current to hydrocarbon vapors in a packed column as described in U. S. Patent No. 2,326,099 is unsatisfactory. When operating the column under correct conditions for dehydration serious plugging in all of the many types of packing employed resulted. The dehydration of caustic solutions by batch distillation in the presence of a non-miscible liquid produced caustic particles of larger than desired size and, in addition, coated the vessel walls heavily with agglomerated caustic.

It has also been suggested that vacuum be used in partial pressure dehydration of aqueous caustic solutions in the presence of a non-miscible liquid. This is not practical since application of vacuum lowers the boiling temperature which in turn lowers the partial pressure of caustic solutions being dehydrated and, if effective partial pressure dehydration is to be accomplished, the vapor pressure of the caustic solution must be kept as high as possible.

The present invention has as an object the provision of a method for preparing finely divided anhydrous alkali metal, particularly sodium and potassium, hydroxides from aqueous solutions thereof by distillation of such solutions in the presence of a non-miscible liquid such as petroleum distillate at atmospheric or super-atmospheric pressure. It is also an object of the present invention to provide means for the preparation of finely divided anhydrous alkali metal hydroxides. Other objects and advantages of the present invention will become apparent to those skilled in the art from the following discussion taken in conjunction with the drawings in which:

Figure 1 is a more or less diagrammatic representation of an apparatus for dehydrating aqueous solutions of alkali metal hydroxide at atmospheric pressure from which finely divided anhydrous alkali metal hydroxide can be withdrawn;

Figure 2 is a more or less diagrammatic representation of an apparatus for dehydrating aqueous solutions of alkali metal hydroxide at super atmospheric pressure from which finely divided anhydrous alkali metal hydroxide can be withdrawn;

Figure 5 is a graph showing the effect of boiling range and operating pressure on the ratio of vapors of petroleum naphtha to water removed during dehydration.

Figure 6 is a graph showing the relation of the melting points and boiling points of solutions of caustic in contact with a $C_{12}$ naphtha (kerosene).

Figure 3:
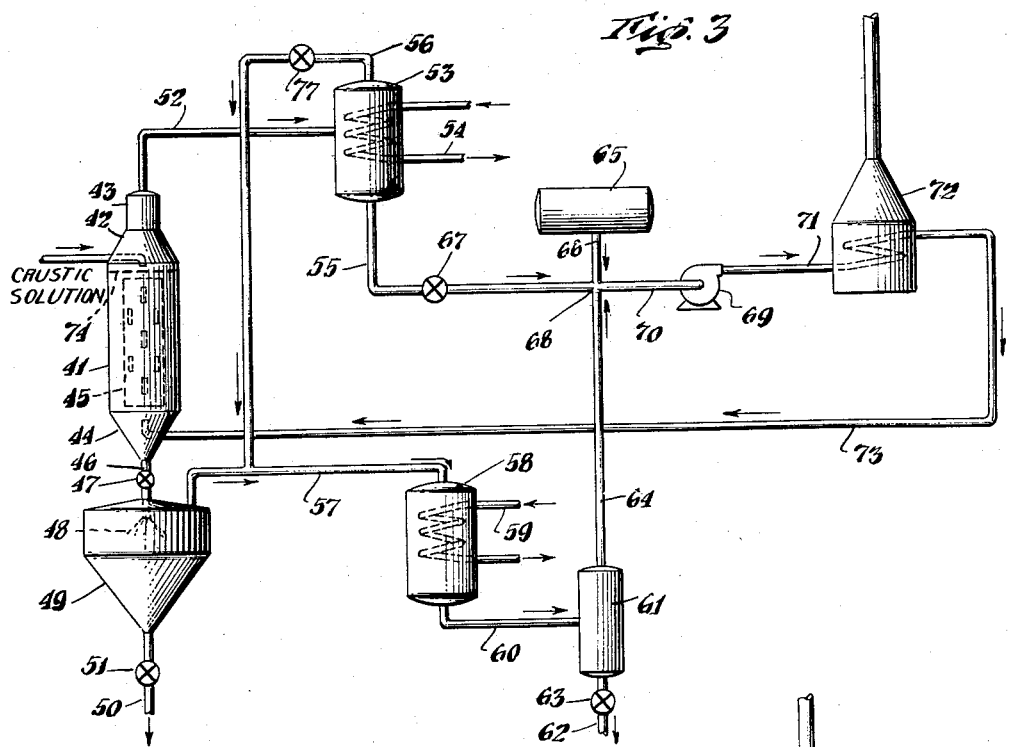
Figure 3 is a more or less diagrammatic representation of the flow in a dehydration process involving dehydration of aqueous solutions of alkali metal hydroxide at super-atmospheric pressure to produce finely divided alkali metal hydroxide.

The vapor pressures of aqueous solutions of alkali metal hydroxide, for example sodium hydroxide, vary over a wide range. Consequently, the boiling temperature of a mixture of an immiscible liquid and an aqueous caustic solution varies with the change in concentration of the alkali metal hydroxide in the aqueous solution. This is illustrated by the graph in Figure 6, wherein the mean average boiling point of a mixture of kerosene and caustic solution over a range of concentrations of caustic in water is shown. Similarly, the melting points of solid caustic solutions vary widely with the concentration of water in the caustic as is shown in Figure 5.

In the preparation of finely divided alkali metal hydroxide, e. g., in the production of particles of alkali metal hydroxide of nearly colloidal size, agglomeration of the particles and adherence of the caustic to the walls of the vessel in which the anhydrous caustic is produced must be avoided. In the present method this is accomplished by maintaining the vessel walls at a temperature no higher than that of the boiling liquid within. Since the vapor pressure of aqueous caustic solutions is low at reduced temperatures, it is necessary to dehydrate aqueous caustic solutions at as high a temperature as practical, particularly when dehydrating aqueous solutions of relatively high caustic concentration. In order to prevent the particles of caustic from agglomerating and to prevent the particles of caustic from adhering to the walls of the vessel, it is necessary to conduct the dehydration whilst violently agitating the caustic solution, and whilst cooling the completely or partially dehydrated caustic while still in free suspension in the dehydrating liquid.

In accordance with the principles of the present invention, the minute droplets of caustic are suspended in a hydrocarbon liquid and, while in that suspension in which each droplet of caustic is protected with a film of hydrocarbon, each droplet is dehydrated while the droplet is suspended in the hydrocarbon liquid. Since the boiling point of a mixture of water and the non-miscible hydrocarbon is lower than the boiling point of the mixture of caustic solution and non-miscible hydrocarbon, the water removed during dehydration does not condense in the vessel.

A suitable vessel for dehydrating aqueous solutions of alkali metal hydroxide such as aqueous solutions of sodium hydroxide at atmospheric pressure is illustrated in Figure 1, which is a vertical cross-section of such a vessel. Dehydration takes place in the elongated, vertical, cylindrical vessel 1 which is tapered at the upper and lower ends thereof. In the cylindrical extension 2 of the upper tapered section baffles can be placed to remove entrained spray from the vapors taken overhead at 5. However, extension 2 need not be so provided with baffles and can be a void space. Inside, and preferably concentric with the vertical axis of vessel 1, is a tube 3, preferably apertured, so constructed and arranged as to be spaced above the bottom of the tapered section 14 of vessel 1. The apertures in tube 3 can be slots, either rectangular or elliptical in shape or any other shape, which will induce circulation from the annular space between the tube 3 and the walls of vessel 1 to the space within tube 3. The aqueous solution of alkali metal hydroxide is introduced into vessel 1 by conduit 4 preferably above the upper level 13 of the non-miscible liquid in vessel 1. Conduit 4 is provided with one or more spray heads 15 whereby the aqueous caustic solution is sprayed upon the surface of the non-miscible liquid. Fresh hot vapors of the immiscible liquid are introduced into vessel 1 by conduit or pipe 6. The hot vapors of non-miscible liquid can be of fresh or recycle non-miscible liquid. At the bottom of tapered section 14 of vessel 1 is a cylindrical section or pipe 8, the lower end of which extends into cylindrical vessel 9 to a point at least appreciably beyond the inlet of recycle pipe 7. Vessel 9 has a diameter which is several multiples of the diameter of pipe 8 and is cooled by injection of non-miscible liquid at low temperatures or by means of jacket 10 through which a coolant, preferably water, flows from inlet 16 to outlet 17. The top and bottom of vessel 9 preferably are tapered. To the bottom tapered section a delivery chute 18 is attached through which a slurry of finely divided anhydrous alkali metal hydroxide in the non-miscible liquid is discharged under control of a suitable valve such as a star valve or pump 11.

Aqueous caustic solutions can be dehydrated at atmospheric pressure in the vessel illustrated in Figure 1 by filling vessel 1 with a non-miscible liquid, such as kerosene or Stoddard's solvent, to a level such as 13. Additional non-miscible liquid is heated in a vessel (not shown) and charged to vessel 1 through line 6. When substantially the entire charge of dehydrating liquid in vessel 1 reaches the boiling point of the non-miscible liquid, an aqueous solution of alkali is introduced into vessel 1 through line 4 and spray 15.

The aqueous solution of alkali can be emulsified in the non-miscible liquid prior to its discharge into vessel 1 by any suitable means, such as orifices, mixers, colloid mills or the like. Alkali stable emulsifying agents such as alkyl phenols, soaps, etc. can be added in trace amounts to the mixture of aqueous solution and non-miscible liquid or the aqueous solution of caustic can be charged without previous emulsification.

When the aqueous caustic solution comes into contact with the boiling non-miscible liquid, violent ebullition ensues. This action tends to disperse further the caustic solution as fine droplets in the non-miscible liquid. Due to the apertures in tube 3 circulation of the liquid suspension of droplets of caustic solution in non-miscible liquid is quite vigorous. Caustic solution, vapors and hydrocarbon rise in the tube 3 while hydrocarbon and caustic tend to descend in the annulus between tube 3 and the walls of vessel 1. Because of the violent boiling action of the droplets of the less concentrated caustic solution, the droplets of relatively dilute solution remain in the uppermost section of the vessel. As the solution of the droplets becomes more concentrated, the droplets circulate downwards because of the less vigorous boiling action resulting from the higher concentration of caustic in the solution which forms the droplets.

Substantially all of the heat required for the dehydration is supplied by vapors of the non-miscible liquid, some of which condense. Near the bottom of vessel 1, where the more concentrated solution of caustic is boiling, the amount of water vapor carried upwards from the droplets of caustic solution by the vapors of the non-miscible liquid is very small. As the vapors rise, however, more water vapor is picked up and additional vapor of the non-miscible liquid is condensed, the heat of condensation supplying heat for the vaporization of the water. Water vapor does not condense because of the excess of vapors of the non-miscible liquid over that required at equilibrium conditions at that temperature. As a result of the excess of vapors of the non-miscible liquid considerably more efficient dehydration is obtained than is possible under batch type dehydration conditions.

As the droplets lose water, the droplets become more dense as the droplets and the fine particles produced settle under gravity through the top of tapered section 14 into the pipe or seal leg 8. From seal leg 8 the particles are discharged into cooling section 9 where any of the particles which are above the melting point solidify before coming in contact with other particles or the walls of the vessel. A recycle line 7 permits a gentle downward circulation into seal leg 8 and vessel 9. This permits the hydrocarbon to circulate slowly downward to the cooling zone with the settling particles, thus keeping pipe 8 warm enough to prevent clogging at the tip of the tapered section at the bottom of vessel 1. Recycle line 7 is provided to maintain a circulation therethrough whenever the flow of non-miscible hydrocarbon is decreased to such an extent that the non-miscible hydrocarbon become static and the droplets must pass through the non-miscible hydrocarbon rather than flow with it. A valve such as a star valve 11 is used to control the flow of the slurry of finely divided i. e., colloidal particles, of solidified alkali metal hydroxide in water-non-miscible liquid through chute 18 to further refinement if desirable or necessary or to storage or to immediate use when required.

The non-miscible liquid, removed in the slurry, is continuously replenished by condensing the vapors thereof withdrawn from vessel 1 through overhead outlet 5 and introducing the condensed vapors after separation from the water, mixing with fresh non-miscible liquid from storage, and heating to the boiling point into vessel 1 through pipe 6.

The uncondensed vapors of the non-miscible liquid are removed with the water vapors from vessel 1 through line 5, condensed, separated from water and re-heated together with make-up non-miscible liquid to the boiling point in suitable equipment not shown.

Thus, it is manifest that the present invention provides a method for dehydrating aqueous solutions of alkali metal hydroxides which comprises establishing a deep column of water-immiscible liquid at a temperature above the boiling point of the mixture of that water-immiscible liquid and the aqueous solution to be dehydrated, introducing a stream of an aqueous solution of alkali metal hydroxide in the form of small droplets into the top of said column of water-immiscible liquid, introducing additional water-immiscible liquid into the bottom of said column of water-immiscible liquid at a temperature above the boiling point of the mixture of the water-immiscible liquid and the aqueous solution to be dehydrated, flowing said droplets of aqueous solution downward through said column of water-immiscible liquid past the point of introduction of hot water-immiscible liquid into a cooling zone to form finely divided particles of solid alkali metal hydroxide, and withdrawing a slurry of finely divided solid particles of alkali metal hydroxide in water-immiscible liquid from said cooling zone.

It is to be noted that when the aqueous solution charged to the dehydration is in the form of droplets having an average diameter not greater than about 200 microns rather than in the form of a spray or emulsion in the non-miscible liquid and has a concentration of about 20 to about 30 per cent by weight alkali metal hydroxide the particles are finer than when a 50 to about 70 per cent by weight alkali metal hydroxide solution is charged. That is, the particles of solid, anhydrous caustic will be colloidal or nearly colloidal when 20 to 30 per cent solutions are charged but the particles of caustic will be small pellets when the more concentrated solutions are charged.

The ratio of water to hydrocarbon vapors removed overhead through line 5 if a function of (a) the concentration of the feed, (b) the charge ratio of vapor of water-immiscible liquid to the caustic feed, (c) operating temperature and (d) the boiling point of the water-immiscible liquid.

The effect of these factors is as follows:

(a) The concentration of the feed

The two controlling factors involved in the dehydration of caustic solutions are (1) the heat required to remove the water (2) the quantity of vapors of non-miscible hydrocarbon required by virtue of the humidity or moisture content of the vapors in equilibrium with the caustic solution being dehydrated. Since the heat required to dehydrate 50 weight per cent NaOH solution to 95 weight per cent NaOH is approximately equal to the heat required to evaporate the water of solution alone, it follows that if a 68 weight per cent NaOH solution is the feed only about half as much water need be removed to obtain a 95 weight per cent NaOH product. As a consequence, only about one half as much heat is required. The 68 weight per cent NaOH solution on the other hand is in equilibrium with vapors of lower moisture content than the 50 weight per cent solution and as a result, under ideal conditions of counter-current dehydration, those vapors in contact with the 50 weight per cent NaOH solution will be able to attain a higher moisture content than the vapors in contact with a 68 weight per cent NaOH solution feed. Although the moisture content of the overhead vapors can be higher when 50 weight per cent NaOH solution is charged, more water must be removed and when the vapors of immiscible hydrocarbon supply the heat of dehydration, the vapors of immiscible hydrocarbon must be charged in sufficient quantities to not only evaporate the water but also to carry away the water evaporated in equilibrium with the caustic charge.

It is the removal of the final 5 to 10% of the water from the caustic which requires vapors of very low moisture content. At the point where the dehydrated caustic is drawn off the counter-current dehydration system, the ratio of vapors of immiscible hydrocarbon to water vapors in the boiling bath must be high and the ratio is independent of the concentration of the caustic charged to the counter-current system.

(b) The charge ratio of water-immiscible hydrocarbon to caustic feed

The vapors of immiscible hydrocarbon charged to the dehydration vessel supply the heat necessary to maintain the caustic solution-immiscible hydrocarbon mixture at its boiling temperature. In giving up their heat to the liquid in the dehydration vessel the vapors condense and thereby maintain a liquid level in the vessel. From a heat transfer point of view, it is desirable to (1) superheat the hydrocarbon vapors in order to provide an initial temperature differential and (2) to distribute the charge vapors in the liquid in such a manner as to provide ample contact time and surface area between the liquid and the vapors. If the rate of feed of hydrocarbon vapors to the dehydration vessel is low with respect to the rate of feed of the caustic solution, the overhead vapors will have a high moisture content but dehydration will not be complete. An increase in the rate with which the hydrocarbon vapors are introduced into the dehydration vessel results in a lower moisture content in the overhead vapors and more complete dehydration. The rate of feed of the hydrocarbon vapors with respect to the rate of feed of the caustic solution is determined on the basis of the degree of dehydration required and economic factors.

(c) Operating temperature and (d) the boiling point of the water-immiscible liquid The operating temperature for a charged caustic solution of given concentration is controlled by the boiling point or boiling range of the immiscible liquid used in dehydration and the pressure to which the liquid is subject. A mixture of caustic solution and immiscible liquid will boil at the temperature at which the sum of the vapor pressure of each is equal to the pressure existent in the system. For this reason the mixture boils at a temperature below the boiling point of either of the individual components. The moisture content of the vapors in contact with the caustic solution can be raised by increasing the boiling temperature. When this is accomplished by the use of a higher boiling immiscible liquid, a relatively large increase in the moisture content of the vapors is obtained. When the temperature at which the mixture boils is raised by increasing only the pressure to which the system is subject, some increase in the moisture content of the vapors is obtained by virtue of the fact that the water vapor pressure over caustic solutions increases more rapidly with an increase in temperature than does the vapor pressure of a water-immiscible liquid such as naphtha in the boiling range of such immiscible liquids.

As has been noted hereinbefore, the dehydration of aqueous solutions of alkali metal hydroxides can be more efficiently carried out at pressures above atmospheric pressure. Dehydration at super-atmospheric pressures permits the use of lower boiling water-immiscible liquids and a more efficient utilization of the heat input. Figure 2 is illustrative of the modification of the equipment, a cross-section of which is depicted in Figure 1 whereby dehydration at pressures greater than atmospheric can be obtained.

Figure 2 illustrates in a more or less diagrammatic manner equipment suitable for the dehydration of aqueous solutions of alkali metal hydroxides at pressures greater than atmospheric employing a water-immiscible liquid. A vessel 21 of generally cylindrical shape and providing a relatively deep column of liquid is provided with an upper tapered section 22 topped by a cylindrical section 23. Section 23 can be a void or provided with baffles to remove entrained spray from the vapors of water and water-immiscible liquid before passing through vapor outlet 24. Vessel 21 is also provided at the lower end with a tapered section 25 and a conduit 26 under control of valve 27 by which the rate of flow of partially or completely dehydrated caustic in water-immiscible liquid into spray chamber 28 is controlled. Chamber 28 is of any suitable shape and size to provide a large volume compared to the capacity of pipe 29 so that upon introduction into chamber 28 which is maintained at atmospheric or subatmospheric pressure, the sudden release of pressure will cause the water-immiscible liquid to flash vaporize. Chamber 28 is provided with a suitable outlet 39 under the control of a suitable valve such as a star valve 30.

Vessel 21 is also provided with a means 31 of introducing the aqueous solution to be dehydrated. Pipe 31 is provided with one or more spray heads 32 whereby the aqueous solution to be dehydrated is introduced into vessel 21 as a plurality of fine streams. To replace the water-immiscible liquid removed as a vapor through pipe 24, hot vapors of the water-immiscible liquid are introduced into vessel 21 through conduit 33. A pressure regulating valve 34 is placed in line 24 to maintain the desired pressure in vessel 21.

Within and preferably concentric with the vertical axis of vessel 21 is an apertured tube 35. The apertures can be rectangular slots, elliptical openings or of any shape provided the size is sufficient to permit passage of streams of suspension therethrough.

The operation of the vessel depicted in Figure 2 is substantially the same as that of Figure 1. Vessel 21 is filled to a level such as 36 with a water-immiscible liquid such as gasoline, carbon tetrachloride, benzene, kerosene, Stoddard's solvent or the like. The liquid introduced as vapors into vessel 21 will be at or above the boiling point of the mixture of the aqueous solution and the non-miscible liquid and preferably should have a boiling point above that of the aqueous solution to be dehydrated at the pressure under which the operation is to be carried out. When the water-immiscible liquid is boiling, the aqueous solution of alkali metal hydroxide to be dehydrated is introduced into vessel 21 preferably as a plurality of finely divided streams through sprayhead 32. Preferably the aqueous solution to be dehydrated is emulsified with some of the water-immiscible liquid either by adding an emulsifying agent stable in alkaline solution such as alkyl phenols or soap and emulsifying the aqueous mixture by mechanical means such as orifice mixers, or the like. As the droplets of aqueous solution of alkali metal hydroxide drop into the boiling water-immiscible liquid, ebullition becomes almost violent. The ebullition combined with the action of tube 35 provides a vigorous circulation of the suspension of droplets of aqueous solution to be dehydrated.

As the droplets become more concentrated, the density increases and the droplets fall to the lower section 25 of vessel 21. The suspension of particles of the concentrated aqueous solution of alkali metal hydroxide in water-immiscible liquid passes through pressure-release valve 27 into pipe 29 provided with sprayhead 37. The lower pressure existing in chamber 28 results in the evaporation of some of the water-immiscible liquid and a small amount of water still remaining in the caustic particles. This evaporation produces a rapid cooling effect which aids in the hardening of the finely divided solid alkali metal hydroxide. The slurry of finely divided alkali metal hydroxide in water-immiscible liquid is withdrawn from chamber 28 through line 29 under the control of valve 30 which preferably is a star valve or a slurry pump.

An integrated dehydrating unit employing the dehydrating vessel illustrated in Figure 2 is illustrated in a more or less diagrammatic manner in Figure 3. A vessel 41 comprising an elongated cylindrical section with an upper tapered section 42 topped by a short cylindrical section 43 and a lower tapered section 44 is provided with an apertured tube 45 concentric with the vertical diameter of vessel 41. Tube 45 is provided with openings of such size and shape as to induce circulation of the suspension in vessel 41 in the annulus formed between tube 45 and the walls of vessel 41 and into and out of tube 45. Tube 45 is suspended in vessel 41 in any suitable manner so that the lower edge of tube 45 is approximately in the plane of the upper edge of tapered section 44 of vessel 41. At the lower end of tapered section 44 vessel 41 is provided with a pipe 46 and a pressure release valve 47. Pipe 46 is provided with one or more sprayheads 48 whereby the suspension of droplets of concentrated aqueous solution of alkali metal hydroxide in water-immiscible liquid is introduced into chamber 49 maintained at a pressure appreciably lower than that of vessel 41. Under the reduced pressure existing in chamber 49, the slurry of dehydrated caustic particles in the water-immiscible liquid is cooled by evaporation and finely divided solid alkali metal hydroxide collected. The slurry of finely divided solid alkali metal hydroxide is removed from chamber 49 through conduit 50 under the control of a valve 51 such as a star valve.

The water vapors and vapors of water-immiscible liquid are withdrawn from section 43 of vessel 41 through overhead pipe 52 under the pressure at which dehydration is occurring. These vapors pass to a heat exchanger 53 wherein heat exchange takes place with a cooler liquid, from a source (not shown), through pipe 54. As a result of the cooling effect in heat exchanger 53 upon the vapors from vessel 41 a large portion of the water-immiscible liquid is condensed and withdrawn through line 55 as a hot dry liquid. This separation technique is possible because the amount of vapors of water-immiscible liquid required to remove a given amount of water from a given amount of aqueous solution of an alkali metal hydroxide is much greater than when the same amount of water is removed in the absence of the alkali. Furthermore, an additional amount of vapor of the water-immiscible liquid is required to maintain adequate dehydration rates. However, no water will condense until the amount of water present in the vapor phase exceeds the amount which can be in equilibrium with the vapors of the water-immiscible liquid at the temperature of the exchanger. The remaining uncondensed vapors of water and water-immiscible liquid pass overhead through pipe 56 under control of pressure release valve 77 to blend in pipe 57 with vapors released in flash chamber 49. The blend vapors in line 57 pass to heat exchanger 58 and are condensed by heat exchange with a coolant introduced into exchanger 58 by pipe 59. The condensate is withdrawn from heat exchanger 58 through conduit 60 to liquid phase separator 61. The aqueous phase is withdrawn from separator 61 through line 62 under control of valve 63. The water-immiscible liquid is withdrawn from separator 61 through line 64.

Water-immiscible liquid to replace that taken out of the system in the slurry at line 50 is withdrawn from storage tank 65 through line 66 and blended in conduit 55 downstream from pressure release valve 67 with hot dry water-immiscible liquid from heat exchanger 53 and water-immiscible liquid from separator 61 at a point 68. The blend of the three streams of water-immiscible liquid is picked up by the suction of pump 69 through pipe 70 and discharged through line 71 into a suitable heating device such as a preheat furnace 72 to be vaporized. The reheated, dry water-immiscible liquid in vapor phase is then returned to vessel 41 through line 73 in such amounts as to maintain a liquid level such as 74.

It is preferred to use as a water-immiscible liquid a hydrocarbon or a mixture of hydrocarbons such as kerosene. The boiling range of the hydrocarbon or mixture of hydrocarbons used in the dehydration of aqueous solutions of caustic is important in that this property, because of vapor pressure relationships, controls the boiling point of the liquid mixture contained in the dehydration vessel. Excessive volumes of low boiling, low molecular weight liquids are required to dehydrate caustic solutions because of the low operating temperatures. While an increase in operating temperature can be obtained by increasing the pressure at which the dehydration is carried out, the improvement in water to hydrocarbon ratio of the vapors coming off overhead from the dehydrator is not nearly as favorable as when higher boiling hydrocarbons or other water-immiscible liquids are employed.

Figure 4:
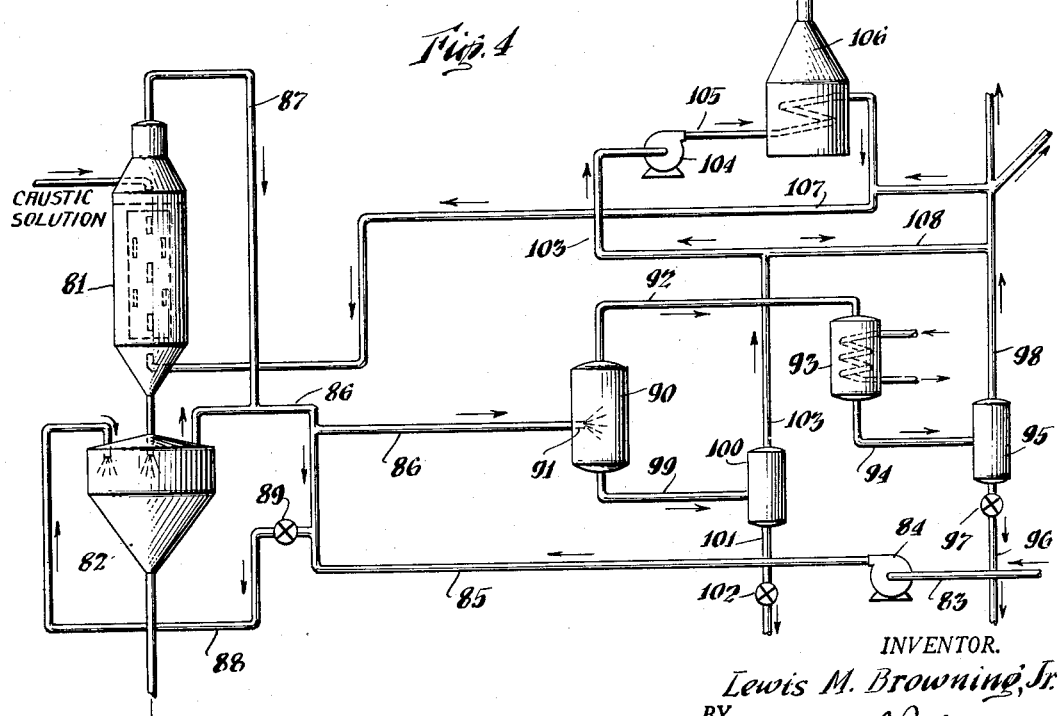
Figure 4 is a more or less diagrammatic illustration of a method for the use of a wide boiling range petroleum distillate in the preparation of finely divided anhydrous alkali metal hydroxide.

However, when only a wide boiling range mixture of hydrocarbons such as a petroleum distillate is available for dehydration or when it is necessary to treat a wide boiling range water-immiscible liquid such as a petroleum fraction such as gasoline with finely divided caustic without contamination by the higher boiling material, the aforesaid difficulty can be overcome in the manner depicted in Figure 4.

Figure 4 is a more or less diagrammatic illustration of a method of dehydrating aqueous solutions of alkali metal hydroxide to produce finely divided solid alkali metal hydroxide using a wide boiling range water-immiscible liquid such as gasoline as a dehydrating liquid or for treating a wide boiling range water-immiscible liquid such as gasoline or other petroleum distillate with finely divided solid alkali metal hydroxide.

In Figure 4 vessel 81 is a dehydrator or treater such as described in detail in conjunction with Figures 1, 2 and 3. Vessel 82 is a flash cooling chamber wherein the finely divided solid alkali metal hydroxide is cooled below the melting point of the finely divided solid hydroxide.

In Figure 4 gasoline or any other wide boiling range water-immiscible liquid which is to be treated, or gasoline or any other wide boiling range water-immiscible liquid which is to be used as a dehydrating agent is brought from a source not shown through line 83 and forced by pump 84 through line 85 to line 86 where it is blended with vapors from flash chamber 82 and vapors coming from dehydrator or treater 81 by way of line 87. When desirable, a portion of the wide boiling range water-immiscible liquid can be removed from line 85 through pipe 88 under control of valve 89 and introduced into flash cooling chamber 82 to further cool the solid finely divided hydroxide in chamber 82.

The blend of vapors from dehydrator or treater 81, vapors from flash chamber 82 and make-up liquid in line 86 is charged to a flash drum, or packed column or bubble tower 90 at 91. At this point a distillation approaching steam distillation takes place. Most of the water and the lower boiling fractions of the water-immiscible liquid or gasoline are taken off overhead through line 92 to heat exchange 93 from which the condensate is removed through conduit 94 to separator 95 wherein the water is withdrawn from the bottom through pipe 96 under control of valve 97 and the lower boiling fractions of the water-immiscible liquid, for example gasoline, are withdrawn overhead through pipe 98 to storage reblending or further treatment as the case may be.

Returning to flash drum, packed column or bubble tower 90 the flow of the higher boiling constituents of the wide boiling range water-immiscible liquid, e. g., gasoline being used as a dehydrating agent or being treated with finely divided solid caustic will be followed.

The higher boiling portion of the wide boiling range water-immiscible liquid form a bottoms in drum or tower 90 and is withdrawn through line 99 to phase separator 100 to separate water which may have condensed from the higher boiling portion of the water-immiscible liquid. The water is withdrawn from separator 100 through line 101 provided with a suitable valve 102 while the separated higher boiling portion of the water-immiscible liquid is withdrawn overhead through pipe 103 by pump 104 and delivered through line 105 to reheater 106. From reheater 106 the higher boiling portion of the wide boiling range water-immiscible liquid is returned through line 107 to the dehydrator.

When necessary or desirable in a dehydrating operation the low boiling constituents of the wide boiling range water-immiscible liquid withdrawn from separator 95 can be blended with the higher boiling portion in pipe 107.

When treating a wide boiling range water-immiscible liquid such as gasoline with finely divided, solid caustic the whole or a portion of the higher boiling portion of the gasoline withdrawn from separator 100 can be withdrawn through line 108 and blended with the lower boiling constituents withdrawn from separator 95 and the blend further treated or sent to storage as the situation may require.

In Figure 5 two sets of curves are presented to show the relation between the per cent weight of water in the overhead vapors from the dehydrator, the operating pressure and the boiling point of the water-immiscible liquid as represented by two fractions of petroleum a $C_{10}$ fraction, Stoddard's solvent and a $C_{12}$ fraction, kerosene. When using a $C_{10}$ fraction as a dehydrating agent at 0 p. s. i. gauge, the vapors from a 50 weight per cent caustic solution contain about 20 weight per cent water. When using a $C_{12}$ fraction as the dehydrating agent at 0 p. s. i. gauge, the vapors from a 50 weight per cent caustic solution contain 45 weight per cent water. However, when operating at 30 p. s. i. gauge, the vapors from a 50 weight per cent aqueous caustic solution, using a $C_{10}$ fraction as dehydrating agent, contain about 17.5% more water than when operating at 0 p. s. i. gauge. When operating at 30 p. s. i. gauge with a $C_{12}$ fraction as a dehydrating agent, the vapors contain about 5 per cent more water. This advantage increases when the concentration of the caustic solution is increased to about 65% when the increase is about 30% for the $C_{12}$ fraction and about 55% for the $C_{10}$ fraction.

It will be noted that in the method for dehydrating aqueous solutions of alkali metal hydroxides described hereinbefore, provision is made for cooling freely falling particles of hydroxide out of contact with solid surfaces at temperatures below that of the particle and to temperatures below the melting point of the particles while the particles are still discrete particles. In this manner, adherence to the walls of the vessel and coalescence or agglomeration of the particles are avoided. It will also be observed that the dehydration of the aqueous caustic is carried out while the suspension of droplets of caustic solution in water-immiscible liquid is subjected to vigorous, in fact almost violent, agitation. By the use of a column of dehydrating liquid having a vertical length sufficient to provide an average residence of at least about 10 minutes and sufficient to provide intimate contact of the vapors of immiscible liquid and caustic solution in said column great liquid depth is provided for long and efficient contact between the droplets of aqueous caustic and the dehydrating agent. Heat for dehydration is supplied by vapors of the water-immiscible liquid produced from substantially caustic free overhead condensate and fresh water-immiscible liquid.

It is to be noted that the aqueous solution to be dehydrated can be emulsified with the dehydrating agent before charging to the dehydrator in the presence or absence of emulsifiers stable in alkaline solutions by means of orifices, mechanical mixers, colloid mills or any other device suitable for producing a fine dispersion of aqueous caustic solution in a water-immiscible liquid. As emulsifiers may be used emulsifying agents such as alkyl phenols which are stable in alkaline solutions. The use of a trap heat exchanger for separating hot, dry water-immiscible liquid from water vapor results in a considerable saving in condenser cooling capacity and total sensible heat requirements. With operation at super-atmospheric pressures a very attractive temperature level is maintained for heat interchange. When a water-immiscible liquid of wide boiling range such as gasoline is used, the lower boiling portion of the dehydrating agent is used to carry off the water vapor while the higher boiling portion is used to dehydrate the aqueous solution.

Suitable water-immiscible liquids are those substantially inert to caustic solutions and boiling within the range of about 300° F. to about 500° F. such as kerosene, Stoddard's solvent, recycle stock from a hydrocarbon cracking process, and the like. Illustrative of a water-immiscible liquid having a wide boiling range is a petroleum distillate such as gasoline boiling within the range of about 100° F. and about 400° F., or a mixture of low boiling water-immiscible liquid or liquids and high boiling water-immiscible liquid or liquids having a boiling range of about 100° F. to 500° F.

I claim:

1. A method of continuously dehydrating an aqueous solution of alkali metal hydroxide to produce finely divided, anhydrous, solid alkali metal hydroxide which comprises establishing a downwardly flowing column of water-immiscible liquid boiling within the range of 100° to 500° F. introducing in a repetitive manner into said downwardly flowing column of water-immiscible liquid in the region of the top thereof a plurality of finely divided streams of an aqueous alkali metal hydroxide solution to be dehydrated to form a suspension of droplets of said aqueous alkali metal hydroxide solution in said water-immiscible liquid as the continuous phase, said column of water-immiscible liquid having a temperature of the boiling point of the mixture of said water-immiscible liquid and said aqueous alkali metal hydroxide solution, introducing heated vapors of said water-immiscible liquid into said flowing column at a point spaced from the point of introduction thereinto of said plurality of streams of aqueous alkali metal hydroxide solution (1) to provide a column of water-immiscible liquid therebetween of sufficient height that the water of said droplets in freely gravitating therethrough is substantially evaporated, (2) to agitate said suspension vigorously, and (3) to maintain the temperature of said suspension at the boiling point thereof at the pressure existing above said flowing column of water-immiscible liquid, whereby water is evaporated from said droplets of aqueous solution, said droplets become denser and gravitate toward the bottom of said column of water-immiscible liquid, flowing said suspension downwardly from said point of introduction into said column of said heated vapors of water-immiscible liquid through a zone where evaporation of the water of said aqueous alkali metal hydroxide solution from said droplets is completed to produce small particles of anhydrous solid alkali metal hydroxide and to form a flowing suspension of said small particles in said water-immiscible liquid, cooling said flowing suspension whilst said small particles are freely falling in said flowing water-immiscible liquid and whilst said small particles are out of contact with solid surfaces having a temperature below the melting point of said particles to a temperature below the melting point of said particles of anhydrous alkali metal hydroxide, and withdrawing said particles of anhydrous solid alkali metal hydroxide.

2. The method of continuously dehydrating aqueous alkali metal hydroxide solution in a flowing column of water-immiscible liquid as set forth and described in claim 1 wherein the aqueous alkali metal hydroxide solution is emulsified in a portion of the water-immiscible liquid before introduction into the column of water-immiscible liquid.

3. The method of continuously dehydrating aqueous alkali metal hydroxide solution in a flowing column of water-immiscible liquid as set forth and described in claim 1 wherein the dehydration is carried out at superatmospheric pressure.

4. The method of continuously dehydrating aqueous alkali metal hydroxide solution in a flowing column of water-immiscible liquid as set forth and described in claim 1 wherein the water-immiscible liquid is a wide boiling range gasoline.

5. The method of continuously dehydrating aqueous alkali metal hydroxide solution in a flowing column of water-immiscible liquid as set forth and described in claim 1 wherein the water-immiscible liquid is kerosene.

6. The method of continuously dehydrating aqueous alkali metal hydroxide solution in a flowing column of water-immiscible liquid as set forth and described in claim 1 wherein the aqueous alkali metal hydroxide solution contains about 40 to about 70 weight per cent alkali metal hydroxide.

7. The method of continuously dehydrating aqueous alkali metal hydroxide solution in a flowing column of water-immiscible liquid as set forth and described in claim 1 wherein the aqueous alkali metal hydroxide solution contains about 20 to about 30 weight per cent sodium hydroxide.

8. The method of continuously dehydrating aqueous alkali metal hydroxide solution in a flowing column of water-immiscible liquid as set forth and described in claim 1 wherein the aqueous alkali metal hydroxide solution contains about 20 to about 70 weight per cent sodium hydroxide and the height of the column between the point of introduction of the aqueous alkali metal hydroxide solution and the entrance to the cooling zone is such as to provide an average residence time therein for the finely divided aqueous alkali metal hydroxide solution of at least 10 minutes.

9. The method of continuously dehydrating aqueous alkali metal hydroxide solution in a flowing column of water-immiscible liquid as set forth and described in claim 1 wherein vapors of water-immiscible liquid are withdrawn as overhead, wherein particles of finely divided, solid, anhydrous alkali metal hydroxide are withdrawn as a slurry in said water-immiscible liquid, said overhead is condensed, water-immiscible liquid is condensed, water-immiscible liquid is separated from said slurry, and said condensed overhead and said water-immiscible liquid separated from said slurry are blended, heated to at least the boiling point of the mixture of water-immiscible liquid and aqueous alkali metal hydroxide solution, and introduced into said column as heated vapors.

10. The method of continuously dehydrating aqueous alkali metal hydroxide solution in a flowing column of water-immiscible liquid as set forth and described in claim 1 wherein the particles of finely divided, solid, anhydrous alkali metal hydroxide are substantially of colloidal dimensions.

References Cited in the file of this patent

UNITED STATES PATENTS

| | | |
|---|---|---|
| 1,251,295 | Sherwin | Dec. 25, 1917 |
| 1,291,025 | Klein | Jan. 14, 1919 |
| 1,402,318 | Rodebush | Jan. 3, 1922 |
| 1,676,277 | Mumford | July 10, 1928 |
| 1,907,988 | Lynn et al. | May 9, 1933 |
| 2,196,594 | Muskat | Apr. 9, 1940 |
| 2,326,099 | Kokatnur | Aug. 3, 1943 |
| 2,393,108 | Kokatnur | Jan. 15, 1946 |
| 2,588,469 | Basilewsky | Mar. 11, 1952 |

OTHER REFERENCES

"Anhydrous Sodium Hydroxide," by Othmer and Jacobs, Jr., Industrial and Engineering Chemistry, Feb. 1940, pp. 154–160, vol. 32, No. 2.